2,958,585

REMOVAL OF IMPURITIES FROM CAUSTIC SODA SOLUTIONS

Forest R. Minger and Wallis R. Bennett, Midland, Mich., assignors to The Dow Chemical Company, Midland, Mich., a corporation of Delaware No Drawing. Filed Oct. 16, 1958, Ser. No. 767,504

3 Claims. (Cl. 23—184)

This invention relates to a process for purifying caustic soda solutions, and more particularly, to an improved method for removing iron from aqueous solutions of caustic soda where it is present therein as an impurity.

It is known that commercial aqueous solutions of caustic soda, unless especially treated, are contaminated with from 10 to over 100 parts of iron per million parts of sodium hydroxide on a dry basis. For many of the modern uses of caustic soda, the presence of any metal is detrimental and iron is particularly undesirable. Numerous methods have been disclosed for the removal of iron impurities where a compound is added to the caustic to effect such a removal. Certain salts of magnesium, barium, and strontium have been most extensively used for this purpose. While many of these salts will remove the iron impurity, the treating compound added will itself contaminate the caustic with metallic residues which are difficult to remove by ordinary methods. This is particularly true with compounds, such as strontium or barium sulfate. Also by the addition of many of the compounds to the caustic, the filtration rate of the resulting caustic soda solution is considerably decreased. Thus, large filter areas and long periods of time have to be devoted to filtration of the caustic after treatment.

It is among the objects of this invention to provide an improved method for removing iron impurities from caustic soda solution. A further object is to provide an improved process where the treatment of the caustic soda solution does not materially decrease the filtration rate of the solution.

The above and other objects are attained by intermixing with a caustic soda solution from 3 to 15 pounds of dextran per ton of anhydrous sodium hydroxide present in the caustic soda solution. The caustic soda solution is treated with the dextran for from 12 to 36 hours and then the dextran with the iron impurities, somehow combined with the dextran, is separated from the treated caustic soda solution by mechanical means, such as filtration. By the addition of the dextran to the solution, the iron impurity is removed and the filtration rate of the caustic sodium solution is not appreciably decreased. A filtration rate of 2.9 cubic feet per hour per square foot may be obtained with a treated solution containing about 50 weight percent caustic soda. This rate is approximately twice the rate obtained when strontium sulfate or magnesium oxide is added to the caustic soda solution to remove the iron impurities.

Although the iron impurities may be substantially removed from caustic soda solutions containing less than 40 weight percent of sodium hydroxide, the method is most effective for the more concentrated caustic soda solutions, such as those containing from 40 to 70 weight percent of sodium hydroxide. Dextran is relatively insoluble in caustic soda solutions containing from 40 to 70 weight percent of sodium hydroxide and thus does not contaminate the caustic.

In carrying out the invention, finely divided dextran is added directly to the caustic solution and is intermixed with the solution. While dextran of substantially any particle size may be employed, it is preferred to use finely divided dextran, such as passing through a 100 mesh standard screen (Tyler) and being retained on a 200 mesh standard screen. With the particles of the treating agent in the above range, they may be readily removed by filtration from the caustic solution without employing special methods or a fine filter medium. If larger particle size is used, generally a greater amount of the treating agent is added to the solution in order to adequately disperse the dextran in the caustic solution to effect the iron removal within a practical time.

While at higher temperatures a shorter treatment time may be required, the temperature of the caustic solution during treatment is generally maintained at a temperature not greater than 50° C. and preferably at room temperature. The solubility of dextran in concentrated caustic soda solutions is practically nil at temperatures below 50° C. but increases with increase in temperature. Thus temperatures above 50° C. are seldom used.

The time required for treatment is not critical and will vary over a wide range depending upon the concentration of the iron impurity in the caustic solution, the quantity of the treating agent added, and the temperaure of the caustic solution. In the absence of unusually high iron impurity concentration, however, a treatment time of from 12 to 36 hours is sufficient, with from 18 to 28 hours being generally preferred at room temperature. A shorter treatment time may be used under conditions of low impurity level and with the employment of a large amount of the treating agent.

For caustic solutions obtained usually in commercial operation, from 3 to 15 pounds of dextran per ton of anhydrous sodium hydroxide is generally used. From 5 to 8 pounds of dextran per ton of anhydrous caustic soda are generally preferred for caustic solutions containing up to around 100 parts of iron impurity per million parts of caustic soda on the dry basis. More dextran may be used for solutions containing higher concentration of impurity. Upon the addition of the dextran to the caustic solution, the mixture is agitated in order to obtain a good contact and to disperse the treating agent throughout the solution. While the agitation should be sufficient to completely intermix the dextran with the solution, it is preferred to agitate the mixture throughout the whole treatment time. The separation of the dextran from the treated solution may be effected by various mechanical methods, such as settling, centrifugation, filtration and the like. Filtration is preferred from the practical standpoint.

The following example further illustrates the invention but is not to be construed as limiting it thereto.

*Example*

To 3 liters of a caustic soda solution containing 50.1 weight percent of sodium hydroxide and 21 parts of iron impurities per million parts of anhydrous sodium hydroxide, 6 grams of dextran were added. The dextran was in a finely divided form passing through a 100 standard mesh screen and being retained on a 200 standard mesh screen (Tyler). The mixture was agitated for 24 hours at 30° C. Upon filtration of the caustic solution after the treatment, a product was obtained which contained 4 parts of iron impurities per million parts of anhydrous sodium hydroxide. In the filtration a multibraided nickel cloth was used. A filtration rate of 2.9 cubic feet per hour per square foot was obtained.

To compare the filtration rate obtained when other compounds are added to purify caustic soda solutions, strontium sulfate and magnesium oxide were used as treating agents for the treatment of caustic soda solution similar to that above. After the treatment, a filtration rate obtained for both the caustic soda solution treated with strontium sulfate and the caustic soda solution treated with magnesium oxide was 1.9 cubic feet per hour per square foot when the filtration was effected with the same filter medium and in the same manner as above.

What is claimed is:

1. A process for removing a substantial portion of iron impurity from solutions of caustic soda containing from 40 to 70 weight percent of sodium hydroxide, which comprises intermixing with the caustic soda solution from 3 to 15 pounds of finely divided dextran per ton of anhydrous sodium hydroxide present in the caustic soda solution, agitating the mixture for from 12 to 36 hours, and separating the dextran with the iron impurity from the mixture to obtain a caustic soda solution having a major portion of the iron impurity removed therefrom.

2. A process for removing a substantial portion of iron impurity from a solution of caustic soda containing from 40 to 70 weight percent of sodium hydroxide, which comprises intermixing with the caustic soda solution from 5 to 8 pounds of finely divided dextran per ton of anhydrous caustic soda solution, agitating the mixture from 18 to 24 hours, filtering the mixture so as to remove the dextran together with the iron impurity from the caustic soda solution.

3. A process according to claim 2 wherein the caustic soda solution contains 50 weight percent of sodium hydroxide and wherein the finely divided dextran has a particle size such that it passes through a 100 standard mesh screen and is retained on a 200 standard mesh screen.

References Cited in the file of this patent

UNITED STATES PATENTS

| | | |
|---|---|---|
| 2,061,505 | Collins | Nov. 17, 1936 |
| 2,155,252 | Beecher et al. | Apr. 18, 1939 |
| 2,610,105 | Pye | Sept. 9, 1952 |